Figure 1:
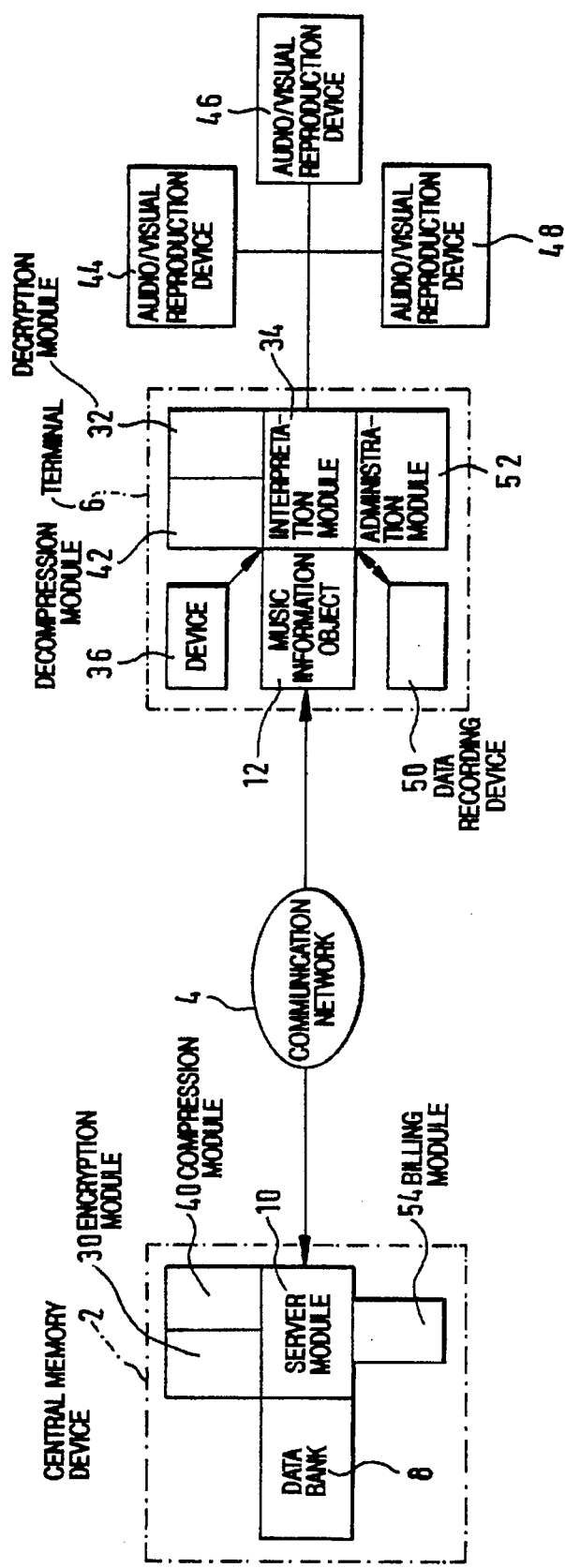

United States Patent [19]
Brugger

[11] Patent Number: 5,636,276
[45] Date of Patent: Jun. 3, 1997

[54] DEVICE FOR THE DISTRIBUTION OF MUSIC INFORMATION IN DIGITAL FORM

[76] Inventor: Rolf Brugger, Keistenweg 1, CH-4310 Rheinfelden, Switzerland

[21] Appl. No.: 424,004

[22] Filed: Apr. 18, 1995

[30] Foreign Application Priority Data

Apr. 18, 1994 [DE] Germany ............... 44 13 451.7

[51] Int. Cl.⁶ .................. H04B 3/00; H04K 1/02
[52] U.S. Cl. .................. 380/4; 380/9; 380/49; 380/50; 380/23; 380/25; 381/77; 381/81
[58] Field of Search ............... 380/4, 9, 10, 19, 380/28, 49, 50, 59, 23, 25; 370/110.1; 381/77, 81; 340/825.31, 825.34

[56] References Cited

U.S. PATENT DOCUMENTS

| | | | |
|---|---|---|---|
| 4,710,921 | 12/1987 | Ishidoh et al. | 370/110.1 |
| 4,789,863 | 12/1988 | Bush | 340/825.35 |
| 4,790,010 | 12/1988 | Sgrignoli | 380/10 |
| 4,991,207 | 2/1991 | Shiraishi et al. | 380/9 |
| 5,191,611 | 3/1993 | Lang | 380/4 X |
| 5,208,665 | 5/1993 | McCalley et al. | 348/12 |

FOREIGN PATENT DOCUMENTS

| | | | |
|---|---|---|---|
| 0416455 | 9/1990 | European Pat. Off. | H04N 7/167 |
| 9411858 | 11/1992 | WIPO | G10H 1/36 |

*Primary Examiner*—Bernarr E. Gregory
*Attorney, Agent, or Firm*—Leydig, Voit & Mayer

[57] ABSTRACT

In order to distribute music information from a central memory device (2) via a communications network (4) to a terminal (6), this information is organized in a digital music information object. The latter comprises a core having basic information relating to the music information object, as well as a number of additional layers having the actual music information. The core includes an encryption table, on the basis of which an encryption module (30) of the central memory device (2) and a decryption module (32) of the terminal (6) respectively encrypt and decrypt the music information object. Furthermore, an interpretation module (34) is provided in the terminal (6) for reproduction conditioning of the music information object, which interpretation module (34) accesses information for checking the authorized use of the music information object, which information is stored in an authorization device (36) and identifies the terminal or the consumer. The invention thus creates a technique for distribution of digital music information which on the one hand provides effective mechanisms for the protection of copyrights and on the other hand makes possible increased services for the consumer.

19 Claims, 2 Drawing Sheets

DEVICE FOR THE DISTRIBUTION OF MUSIC INFORMATION IN DIGITAL FORM

The invention relates to a device for the distribution of music information, which comprises, on the supplier side, a central memory device which is connected to a communications network or is integrated therein and has a databank of digitized music information and, on the consumer side, a terminal which can be connected to the central memory device via the communications network, the central memory device being equipped with a server module and the terminal being equipped with a retrieval module and the two modules having the capability to interact via the communications network in order to order and transmit selectively chosen music information. The invention further relates to an information object for the transportation and distribution of music information in digitally coded form.

In the present context, music information is understood to mean all information which is associated in any form with pieces of music. This includes, in particular, actual pieces of music (audibly reproducible sound and tone information) as well as titles, texts, librettos; statements relating to copyright holders such as composers, lyricists, arrangers, interpreters, orchestras, producers, audio technicians; playing duration statements, recording data, orchestra formation, composition, instruments; score material such as musical scores, individual tunes, arrangements, extracts; illustrative and video material, such as cover illustrations, video clips, and musical films.

Such music information is supplied and distributed in a conventional manner in a very different form, such as pieces of music on records, magnetic tapes, compact disks, which are obtainable mainly in music shops and department stores, score material as individual sheet music, leaflets or books which are on sale in bookshops and music specialists, etc.

It is in this case disadvantageous for the consumer that no common reference source is available which would allow mutually associated parts such as, for example, a music recording, the associated original music score and the arrangement on which the recording is based to be obtained as a unit. Furthermore, the music information must in each case be obtained as an entity in the form supplied, even if, for example, only one individual piece on a compact disk or an individual instrumental tune of a composition is of interest.

In addition, there are major problems associated with the previous distribution forms for the producers and suppliers with respect to ensuring their copyrights and the payments associated with them, since both audio and video media and printed documents can easily be copied or rerecorded, as is known, in an unauthorized manner.

In principle, digital information and computer technology could lead to new solutions here since, with its present level of development, it offers various options for the transmission and distribution of digital data and thus, inherently, of music information in digital form as well. Suitable techniques which may allow the abovementioned problems to be solved on this basis have not yet become known, however.

It is thus an object of the present invention to create a device and an information object of the type mentioned initially which allow the present-day options of digital information and computer technology to be utilized and, at the same time, on the one hand simplify the distribution for the consumer with improved service and, on the other hand, ensures effective protection of the copyrights.

It is accordingly proposed to organize the music information with a defined format in a digital music information object. In this case, the music information object has a core which includes specific basic information, namely at least one object information code, information on the object structure, a consumer code and an encryption table, as well as one or more additional layers which are attached to the core and include the actual music information. Furthermore, the central memory device has an encryption module for encryption of the music information object before its transmission, and the terminal has a decryption module for decryption of the music information object before its reproduction, encryption and decryption being based on the encryption table which is included in the core. In addition, the terminal is provided with an authorization device with identification information for identification of the terminal and/or of the consumer. The interpretation and reproduction conditioning of the music information object is carried out by an interpretation module which is present in the terminal, it being possible for the interpretation module or, possibly, the decryption module as well to call up identification information of the authorization device for authorization checking before the reproduction conditioning.

The combination of the decryption module in the terminal, the encryption table embedded in the music information object and the authorization device associated with the terminal forms a very highly effective safety mechanism for protection against unauthorized use of the music information included in the music information object, since all the involved components, that is to say the corresponding module in the terminal, the music information object and the terminal must first be matched to one another and must secondly be authorized by the supplier for their reproduction conditioning in each case. Illegal copying and rerecording of music information are in this way prevented with high reliability, and observance of the copyrights is thus enforced.

According to a preferred embodiment, the core of the music information object additionally includes an authorization checking program part which can be called up by the interpretation module or the decryption module for authorization checking. The arrangement of such an authorization checking program part in the music information object itself offers a simple capability of modifying the method of operation of the authorization check from time to time and thus of protecting the safety mechanism to an increased extent against potential imitators, in the long term as well. For this purpose, the authorization checking program part must advantageously and individually be modified into newly distributed music information objects, and the other components which are involved with the reproduction conditioning can continue to be used without modification.

In order to make possible rapid and cost-effective remote data transmission, the music information object is expediently compressed using a data compression method. For this purpose, the central memory device can have a compression module for compression before transmission, and the terminal can have a decompression module for decompression before reproduction.

It is preferably intended for the terminal to be provided with a data recording device by means of which the transmitted music information objects can be stored locally on a data medium. In addition to the subsequent reuse of the music information objects which is made possible in this way, this allows an administration module to be provided in the terminal, which administration module assists the consumer in searching for desired music information in the locally existing music information objects and can make further functions available for their automatic reproduction.

In a further embodiment of the invention, the central memory device has a billing module which, by interacting with the server module, determines the costs of the music information supplied to the consumer, bills these costs to the consumer and, possibly, also maintains a book on the copyright holder outgoings incurred. Furthermore, the core of the music information object can expediently include billing information by means of which the provision costs and, possibly, the transmission costs can be displayed to the consumer.

According to a preferred embodiment in the sense of a largely or completely self-descriptive information object in the respective additional layer, the music information object can include associated data description information and/or specific program parts, in particular for reproduction of the music information, in addition to the music information. Different layer classes are expediently provided for the additional layers, which layer classes are preferably subdivided as follows:

audio layer class, suitable for audio information; score layer class, suitable for information which is to be conditioned graphically, in particular score material; text layer class, suitable for text information, for example title or interpretation statements, recording data etc.; video layer class, suitable for video information, in particular illustrative material, video clips, films. The structure, which is split into any desired number of additional layers, of the music information object furthermore allows, in an advantageous embodiment, the music information which is included in the respective additional layer to be coded in a format which is matched to the respective layer class.

In summary, the invention creates an especially suitable technique for the transmission and distribution of music information in digital form. This provides, on the one hand, the necessary mechanisms for protection of the copyrights and, on the other hand, defines a music information object whose design allows a standardizable structure, which can nevertheless be extended in a flexible manner and can be matched to the wide ranging forms of music information and its reproduction.

In addition to the already mentioned advantages, the invention is furthermore distinguished by the fact that:

the expensive and cost-intensive production of audio and video media as well as their packaging, storage and transportation are avoided;

the production of media materials, which are difficult to dispose of, is avoided;

scores and texts need not be printed to be held in stock;

the immediate availability of the desired music information from the databank is ensured;

music information can be collated and transmitted in accordance with the consumer's requirement; and license rights can be billed effectively in accordance with use.

Figure 2:
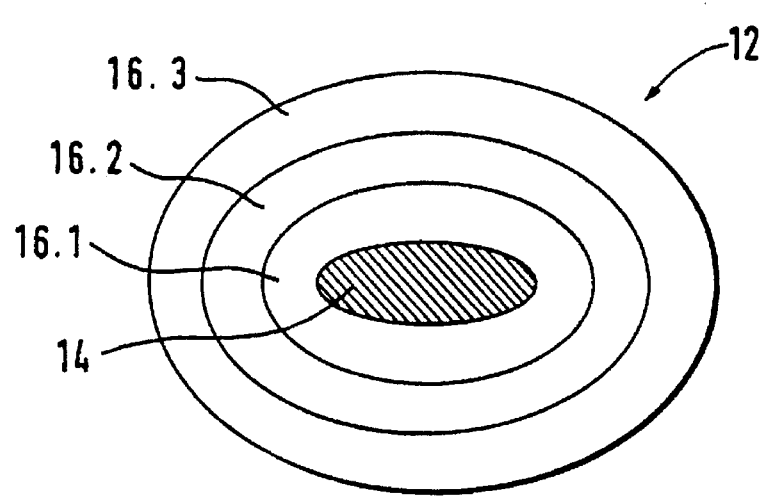
Figure 3:
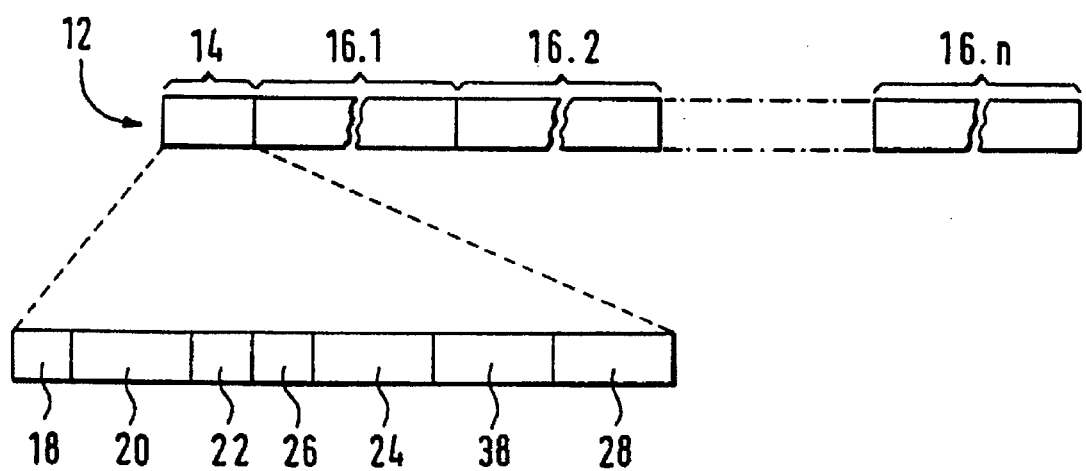

An exemplary embodiment is described in the following text, with reference to the attached drawings, in order to explain the invention in more detail, in which drawings:

FIG. 1 shows a schematic block diagram of a device according to the invention for the distribution of music information, FIG. 2 shows an illustrative representation of a music information object having a core and attached additional layers and FIG. 3 shows the music information object in a schematic illustration with a core illustrated in detail.

In the case of the device which is illustrated schematically in FIG. 1 for the distribution of music information, 2 designates a central memory device which is connected to a communication network 4. As a rule, the central memory device 2 will be a relatively large computer system, a host computer, which is operated by a supplier, for example a music press. An integrated-service digital network (ISDN), a packet-switching network or an ATM network is expediently provided as the communications network 4, which networks have the required performance data corresponding to the relatively large amount of data to be transmitted. In the sense of an integrated-service network, the central memory device 2 can also be integrated in the communications network 4 and can be maintained directly by the network operator, for example the national telephone company.

A terminal 6 is used at the consumer end. This terminal 6 must be suitable for digital data processing, that is to say equipped at least with a processor, associated memory and data input and output devices, and is preferably a personal computer or a workstation. The terminal 6 can be connected to the communications network 4, and via this network to the central memory device 2, in a conventional manner, for example by an ISDN telephone set or a corresponding built-in board.

The central memory device 2 has a databank 8 with a supply of digitized music information. The central memory device 2 is equipped with a server module 10 and the terminal 6 with a retrieval module 11, for access to the databank 8. The server module and retrieval module interact via the communications network and supply the consumer with the functions necessary for searching, selection and ordering as well as transmission of the desired music information. The databank 8 is preferably of object-oriented design and is provided with access mechanisms which allow searching on the basis of criteria which are as varied as possible, in particular on the basis of titles, text contents, copyright holder statements, recording data, composition, instruments, information on existing score material, etc. In addition, it is, of course, also possible to make statements required for ordering available to the consumer in a different way. This includes, inter alia, catalogs, advertising offers in the various media and insertions into current radio and television transmissions.

According to the invention, the music information selected by the consumer for transmission is organized in a digital music information object 12 whose design is illustrated in FIGS. 2 and 3. The music information object 12 may be a binary data signal. In a preferred embodiment, the music information object 12 may include a core 14 and one or more additional layers 16. The core 14 and the layers 16 each have a data structure of at least 256 bits. By way of example, three additional layers 16.1, 16.2 and 16.3 are assumed in FIG. 2, and the designation 16.n for the last layer in FIG. 3 indicates that the music information object 12 may include a number of additional layers.

The core 14 includes the basic information for the whole of the music information object. This information in principle comprises an object identification code 18 for unambiguous identification of the music information object, object structure information 20 which describes the design of the music information object, in particular the number and type of additional layers 16, a consumer code 22 which is assigned unambiguously to one consumer and is assigned by the supplier or, for example, can also be the network subscriber number, as well as an encryption table 24, which will be described in more detail further below. In addition, the core 14 can include still further basic information, for example a supplier code 26 or billing information 28, which provides information on the costs of the supplied music information billed to the consumer.

The contents of the additional layers 16 are formed by the actual music information desired by the consumer. The composition of a music information object is carried out by the server module 10 in accordance with the selection by the consumer. If, for example, the consumer selects a piece of music and an associated score arrangement, then the server module produces a core 14 with the corresponding basic information and attaches the required additional layers 16 to this information. In this case, for example, in each case one additional layer can be provided for the audio information of the piece of music which can be reproduced audibly, for the graphical information of the score material and for the associated text information (name of the piece of music, statements relating to the participants etc.). Further additional layers are attached in the same manner (and the basic information in the core is correspondingly supplemented) if the consumer also wishes to receive other music information with the same order.

The music information is expediently presented in a format which is in each case matched to the specific data type, the selection of any desired format and any desired description language being possible in the context of the invention. Thus, for example, the audio data can be digitized directly via an analog to digital convertor or else can be described by means of the GMIDI (General Musical Digital Instrument Interface) architecture which has already been in use for a relatively long time in digital musical equipment. A description language such as Postscript and one of the known video formats for video data are likewise possible for graphical information. In addition to the actual music information, an additional layer can include associated data description information or else program parts which are used for reproduction conditioning.

In the case of a preferred embodiment of the music information object, dedicated layer classes having a standardized design which is matched to the data type are provided for the various data types. In an especially preferred embodiment, audio information is included in an additional layer in the audio layer class, score material which is to be conditioned graphically is included in an additional layer in the score layer class, text information is included in an additional layer in the text layer class, and video information is included in an additional layer in the video layer class.

The music information object 12 is encrypted for transmission. The central memory device 2 has an encryption module 30 for this purpose. The encryption is based on the encryption table 24 which—as mentioned further above—is likewise included in the core 14, and is carried out, for example, using a pixel-matrix cryptography method.

In order to be able to reproduce the contents of the music information object, the terminal 6 must have a decryption module 32, which in turn operates using the encryption table 24 which is included in the core 14 of the music information object, as well as an interpretation module 34 which interprets the additional layers 16 on the basis of the basic information included in the core 14 and conditions the music information into a form which is suitable for reproduction.

As an additional safety precaution, the terminal 6 must furthermore be equipped with an authorization device 36, for example in the form of a dongle, a chipboard, a PCMCIA board or a CD-ROM, which is made available by the supplier of the music information. Identification information for the identification of the consumer or of the terminal, such as the consumer code for example, is stored in encoded form on the authorization device, such that it can be called up by the decryption module 32 or by the interpretation module 34 for the purpose of checking authorization.

In this way, the music information object 12 can be reproduced only if both the decryption module 32 and the interpretation module 34 as well as the authorization device 36 and the encryption table 24 which is included in the music information object are correctly present.

These safety mechanisms are preferably further reinforced by the core 14 of the music information object additionally including an authorization checking program part 38 which can be called up by the decryption module 32 or by the interpretation module 34 for authorization checking. Since the authorization checking program part 38 is in each case transmitted with the music information object, the supplier has the capability to vary the sequence of the authorization check from time to time and thus further reinforce the safety against the copying protection being circumvented.

For rapid and cost-effective transmission of the music information object, it is advantageous to compress this music information object using a data compression method. For this purpose, the central memory device 2 can have a compression module 40, and the terminal 6 can have a decompression module 42.

If the music information is conditioned for reproduction by the interpretation module 34 in the terminal 6, it can be output in a known manner on audio or visual reproduction devices. These can be provided in the terminal or, as is designated by the reference symbols 44, 46 and 48 in FIG. 1, can be connected thereto. Suitable reproduction devices are, for example, a sound board, to which loudspeakers or a music system are connected, a monitor or a printer with graphics capability. The consumer is thus able to listen to the transmitted pieces of music, to view video films on a monitor and to output text information, score material and illustrations on a monitor or a printer. The music information, in particular musical data in the GMIDI format or illustrative data, can possibly be processed further by the consumer, as well, as required by means of corresponding, known programs.

As a rule, the terminal 6 is additionally equipped with a data recording device 50 by means of which the music information objects, once they have been transmitted, can be stored locally on a data medium, for example a diskette, a magnetic, optical or magnetooptic storage disk or a semiconductor memory.

As a further component, the terminal 6 can have an administration module 52 which provides additional functions for organization and reproduction of the locally stored music information objects. In a simple version, which is provided primarily for private users, the functions comprise, for example, searching for specific music information, automatic playing of any desired sequence of pieces of music and the collation of music programs for specific purposes, including pauses and individual recordings, for example announcements or speeches. More far-reaching functions are conceivable in extended versions, in particular for discotheques or radio and television studios, for example the display of information on the currently running piece of music on the monitor, automatic program design using the statements relating to the pieces of music in the music information objects, addressing of other pieces of music which are present in archives, or automatic recording of advertising blocks.

The incorporation of additional functions is, of course, also possible at the supplier's end. Thus, for example, a billing module 54 can be provided in the central memory device 2, which billing module 54 takes account of the charges to the consumer arising from statements on the transmitted music information objects and, possibly, bills outgoings incurred on behalf of the copyright holders.

I claim:

1. A device for the distribution of music information comprising:

a central memory device which is connected to a communications network and has a databank of digitized music information and, a terminal which is connected to the central memory device via the communications network, the central memory device being equipped with a retrieval module and the said modules having the capability to interact via the communications network in order to order and transmit selectively chosen music information, wherein the selectively chosen music information is organized with a defined format for transmission in a digital music information object, the format including a core and a number of additional layers, the core including at least one object identification code, object structure information, a consumer code and an encryption table and the one or more additional layers including the actual music information, wherein the central memory device has an encryption module for encryption of the music information object before transmission using the encryption table, and wherein the terminal has a decryption module for decryption of the music information object before its reproduction using the encryption table, an interpretation module for interpretation and reproduction conditioning of the music information object as well as an authorization device having identification information for identification of the terminal and of the consumer which is retrievable by the interpretation module and by the decryption module for authorization checking.

2. The device as claimed in patent claim 1, wherein the core of the music information object includes an authorization checking program part which is retrievable by the interpretation module and/or by the decryption module for authorization checking.

3. The device as claimed in claim 1 wherein the central memory device (2) has a compression module (40) for compression of the music information object (12) before transmission, and the terminal (6) has a decompression module (42) for decompression of the music information object (12) before reproduction.

4. The device as claimed in claim 1 wherein the terminal (6) is provided with a data recording device (50) for local storage of the transmitted music information objects on a data medium.

5. The device as claimed in patent claim 4, wherein the data medium is a diskette, a magnetic, optical or magnetooptic storage disk or a semiconductor memory.

6. The device as claimed in claim 5, wherein the terminal (6) is a personal computer or a workstation.

7. The device as claimed in claim 1 wherein at least one reproduction device (44,46,48) is provided for audible or visual reproduction of the music information in the terminal (6), or is connected to the nominal.

8. The device as claimed in claim 1 wherein the respective additional layer of the music information object includes associated data description information and program parts in addition to the music information.

9. The device as claimed in claim 8, wherein each additional layer (16;16.1,16.2,16.3, 16.n) belongs in each case to one of the following layer classes:

a) audio layer class, provided for audio information;

b) score layer class, provided for information which is to be conditioned graphically;

c) text layer class, provided for text information;

d) video layer class, provided for video information.

10. The device as claimed in patent claim 9, wherein the music information which is included in the respective additional layer (16;16.1,16.2,16.3,16.n) is coded in a format which is matched to the respective layer class.

11. The device as claimed in claim 1 wherein the terminal (6) has an administration module (52) for music information objects (12).

12. The device as claimed in claim 1 wherein a billing module (54) for billing the costs of the music information supplied to the consumer is provided in the central memory device (2).

13. The device as claimed in claim 12, wherein the core (14) of the music information object (12) includes billing information (28) on the costs of the music information.

14. The device as claimed in claim 1 wherein the core of the information object includes an authorization checking program part.

15. The device as claimed in claim 14, further comprising means for compressing the information object using a data compression method.

16. The device as claimed in claim 15, wherein the respective additional layer includes associated data description information and program parts in addition to the music information.

17. The device as claimed in claim 14 wherein each additional layer belongs to one of the following layer classes:

a) audio later class, provided for audio information;

b) score layer class, provided for information which is to be graphically displayed;

c) text layer class, provided for text information;

d) video layer class, provided for video information.

18. The device as claimed in claim 17, wherein the music information which is included in the respective additional layer is coded in a format which is matched to the respective layer class.

19. The device as claimed in claim 18, wherein the core includes billing information on the costs of the music information.

* * * * *

UNITED STATES PATENT AND TRADEMARK OFFICE
CERTIFICATE OF CORRECTION

PATENT NO. : 5,636,276
DATED : June 3, 1997
INVENTOR(S) : Brugger

It is certified that error appears in the above-indentified patent and that said Letters Patent is hereby corrected as shown below:

Column 7, Line 41, after "and" delete --/or--;

Column 8, Line 4, change "nominal" to --terminal--;

Line 44, change "later" to --layer--.

Signed and Sealed this

Fourteenth Day of October, 1997

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO.   : 5,636,276
DATED        : June 3, 1997
INVENTOR(S)  : Rolf Brugger It is certified that error appears in the above-identified patent and that said Letters Patent is hereby corrected as shown below:

Column 7,
Line 14, after "a" insert -- server module and the terminal being equipped with a --.

Signed and Sealed this

Fourth Day of September, 2001

*Attest:*

*Attesting Officer*

NICHOLAS P. GODICI
*Acting Director of the United States Patent and Trademark Office*